(12) United States Patent
Kang et al.

(10) Patent No.: US 7,367,013 B2
(45) Date of Patent: Apr. 29, 2008

(54) METHOD FOR INTEGRATING LINUX KERNEL AND APPLICATION SOFTWARE PACKAGES AND GENERATING INSTALLATION FILE LIST BASED ON CML2 COMPUTER LANGUAGE

(75) Inventors: Woochul Kang, Daejeon (KR); Hee-Chul Yun, Daejeon (KR); Heung-Nam Kim, Daejeon (KR); Sun Ja Kim, Daejeon (KR); Young Joon Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 567 days.

(21) Appl. No.: 10/445,824

(22) Filed: May 28, 2003

(65) Prior Publication Data

US 2004/0123286 A1   Jun. 24, 2004

(30) Foreign Application Priority Data

Dec. 23, 2002   (KR) ...................... 10-2002-0082339

(51) Int. Cl.
*G06F 9/44* (2006.01)
(52) U.S. Cl. ...................... 717/106; 717/175
(58) Field of Classification Search ........ 717/168–178, 717/106–107
See application file for complete search history.

(56) References Cited

U.S. PATENT DOCUMENTS 5,555,416 A     9/1996   Owens et al.
6,117,187 A     9/2000   Staelin
6,301,707 B1   10/2001   Carroll et al.

OTHER PUBLICATIONS

Raymond, "CML2 Language and Tools Description", Thyrsus Enterprise, pp. 1-24, Jun. 2000.*
Raymond, "CML2 Transition Guide", http://www.catb.org/esr/cml2/transition.html, pp. 1-5, Apr. 2001.*
Raymond, "CML2 1.0.0 Release Announcement", http://www.uwsg.iu.edu/hypermail/linux/kernel/0104.1/0256.html, pp. 1-4, Oct. 2001.*
Eric Raymond, "The CML2 Resources Page", http://www.catb.org/~esr/cml2, p. 1, Feb. 2002.*

* cited by examiner

*Primary Examiner*—Ted T. Vo
(74) *Attorney, Agent, or Firm*—Lowe Hauptman Ham & Berner, LLP

(57) ABSTRACT

A Linux kernel and an application software package are integrally installed at a target computer by using a CML2. Setup options of the application S/W package to be installed at the target computer are described in an option information file. The option information file of the application S/W package is converted into a CML2 rule file and the CML2 rule file of the application S/W package is then integrated with a CML2 rule file of the Linux kernel, thereby realizing integrated configuration of the Linux kernel and the application S/W package and preparing an environment where dependency rules between the Linux kernel and the application S/W package can be described. Since every option in the option information file has a file list and these file lists are stored in a file list table, an installation file list that describes files finally installed at the target computer can be easily generated.

13 Claims, 13 Drawing Sheets

FIG.3

```
<OPTION NAME>              ~20  ⎫
    < SHORT HELP >         ~21  ⎪
    < LONG HELP >          ~22  ⎬ 25
    < FILE LIST >          ~23  ⎪
    < DEPERDENCY RULE >    ~24  ⎭

<OPTION NAME>                   ⎫
    <GROUP ATTRIBUTE     ~29    ⎪
      INFORMATION>               ⎬ 26
    <SHORT HELP>                ⎪
    <LONG HELP>                 ⎭

<OPTION NAME>                   ⎫
    < SPECIES >                 ⎪
    < SHORT HELP >              ⎬ 27
    <LONG HELP>                 ⎪
    <FILE LIST>                 ⎭

<OPTION NAME>                   ⎫
    < SPECIES >                 ⎪
    < SHORT HELP >              ⎪
    < LONG HELP >               ⎬ 28
    < FILE LIST >               ⎪
    < DEPENDENCY RULE >         ⎭ o  o  o  o
```

FIG.5

```
                    50
               SYMBOLS  51              52          53
                    <SYMBOL NAME> <SHORT HELP>  TEXT  } 56
         54 ~  <LONG HELP>                                  } 58
         55 ~  .
                    <SYMBOL NAME> <SHORT HELP>  TEXT  } 57
                    <LONG HELP>
                    o  o  o  o

59
               MENUS    60              61          62
                    <SYMBOL NAME> <SHORT HELP>  TEXT  } 65
         63 ~  <LONG HELP>                                  } 67
         64 ~  .
                    <SYMBOL NAME> <SHORT HELP>  TEXT  } 66
                    <LONG HELP>
                    o  o  o  o 68      69
               MENU  <MENU NAME>
                    <SYMBOL NAME> or <MENU NAME> ~ 70  } 72
                    <SYMBOL NAME> or <MENU NAME> ~ 71

73
               MENU  <MENU NAME>
                    <SYMBOL NAME> or <MENU NAME>       } 74
                    o  o  o  o

<DEPENDENCE RULE 1>
                    <DEPENDENCE RULE 2>  } 75
                    o  o  o  o
``` ized configuration of the Linux kernel and application S/W packages can be allowed.

METHOD FOR INTEGRATING LINUX KERNEL AND APPLICATION SOFTWARE PACKAGES AND GENERATING INSTALLATION FILE LIST BASED ON CML2 COMPUTER LANGUAGE

FIELD OF THE INVENTION

The present invention relates to a method for integrating application software packages by using a CML2 (configuration menu language 2) computer language; and, more particularly, to a method for implementing integrated configuration of a Linux kernel and the application software packages and generating an installation file list based on the CLM2 computer language.

BACKGROUND OF THE INVENTION

An embedded system refers to a computer system or a computing apparatus based on a microprocessor. The embedded system is designed to perform an exclusive operation or to be used with a specific application S/W package. A personal digital assistant (PDA), a cellular phone, a digital TV and a game machine, and the like, are examples of such embedded system. Conventionally, these embedded systems are operated either by an exclusive program without the need of an operating system (OS) or by employing a simple operating system and the application S/W package.

However, recent trend for a highly sophisticated embedded system has intensified a demand for an operating system capable of providing high technologies such as TCP/IP (transmission control protocol/Internet Protocol) communication agreement, flash memory management and support for a 32-bit high-speed CPUs (central processing units). Such current needs lead many embedded system developers to see Linux as a cost-effective and a convenient operating system for embedded systems. The reason is that the Linux operating system includes many functionalities required for a modern operating system and can be readily modified and distributed based on a GPL (GNU Public License).

The embedded system includes a CPU, a memory, a peripheral equipment, etc. Different embedded systems have different CPUs, memories and peripheral equipments, which is different from a case of general personal computers. Generally speaking, embedded systems have a small memory and a CPU not that fast. Accordingly, specifications of an embedded system should be considered at a time of installing Linux therein. In addition, it should be possible to select application S/W packages to be installed at a target system. Still further, a development environment where a user can selectively install files in an application S/W package should be prepared.

It is a frequent case that there exits dependent relationship between a Linux kernel and application S/W packages, which makes it difficult to appropriately install the Linux kernel and the application S/W packages at a target computer. For example, an X window application package can be normally operated only if an option 'unix domain socket' is selected in the Linux kernel. Thus, the Linux kernel and the application S/W packages should be installed together in order that the dependent relationship therebetween is properly examined and reported to the user, and the application S/W packages are automatically installed at the target computer.

In general, the Linux kernel and the application S/W packages are set in different ways. The Linux kernel is set by using a BASH shell script computer language and a TK script computer language, and the like, while there is no generalized way for the setup of the application S/W packages but a peculiar language is employed for each package. Therefore, it is impossible to describe the correlation between the Linux kernel and the application S/W packages. As an effort to solve this problem, Lineo Embedix, for instance, employs an ECD (Embedix Component Descriptor) file in which setup options of the Linux kernel and the application S/W packages are described together. The Linux kernel and the application S/W packages respectively have their own ECD files and describe therein their setup options. By letting each option in an ECD file have a specific dependency rule, integrated configuration of the Linux kernel and the application S/W packages can be allowed.

The ECD file, however, is not a generally used format but the one only employed by Lineo Embedix. The Linux kernel has 2000 setup options, approximately. If these setup options are converted into the ECD files, the data amount of produced ECD files will be summed up to several mega bytes. Furthermore, it is very difficult to automatically convert the setup options of the Linux kernel into the ECD files.

A CLM2 is a computer language developed by Eric Raymond for the purpose of simplifying a complicated setup method of the Linux kernel. Though the CML2 language is initially developed to alleviate the complicacy of the setup of the Linux kernel, it should be noted herein that the CML2 language is an extensible language that has a wide range of application. The CML2 language is composed of symbols for describing setup options, menus for defining hierarchical relationships between the symbols, and dependency rules for specifying dependent relations between the symbols. The CML2 is a rule-based language. Thus, if there occurs violation of the rule while setting values of the symbols, such rule violation is automatically examined and reported to the user. The CML2 language will be employed as a basic language for the setup of the Linux kernel, starting from its version 2.4.x. CML2 rules are compiled by a CML2 compiler and are displayed to the user via a CML2 front-end. At this time, the result can be provided in the form of a text or graphics. The user selects the setup options displayed by the CML2 front-end depending on the necessity of the target computer, and final results of such setting process are symbols selected by the user.

As described above, the Linux kernel and the application S/W packages should be described by using a same method for the integration of the Linux kernel and the application S/W packages. Though conventional Lineo Embedix employs the ECD file format for this purpose, there still exists a defect in that data amount is greatly increased up to several mega bytes when the setup options of the Linux kernel are converted into the ECD files and, furthermore, the ECD files should be produced in a manual mode every time the Linux kernel is modified. Therefore, if it is considered that the Linux kernel is an open source and thus frequently modified, the method using the ECD files proves to be inefficient.

SUMMARY OF THE INVENTION

It is, therefore, an object of the present invention to provide a method for implementing integrated configuration of a Linux kernel and application S/W packages by way of employing a CML2 computer language and generating an installation file list by adding a list of files to be installed at a target computer into option information files of the application S/W packages based on the result of the integrated configuration.

In accordance with the present invention, there is provided a method for integrating a Linux kernel and application software (S/W) packages and generating an installation file list based on a CML2 computer language, the method including: (a) generating an option information file for each application S/W package, recording a plurality setup options in the option information file and identifying each setup option from others; (b) converting the option information file into a first CML2 rule file and storing the first CML2 rule file; (c) integrating the first CML2 rule file and a second CML2 rule file of the Linux kernel to obtain an integrated CML2 rule file and storing the integrated CML2 rule file; and (d) generating the installation file list by compiling the integrated CML2 rule file.

BRIEF DESCRIPTION OF THE DRAWINGS

The above and other objects and features of the present invention will become apparent from the following description of a preferred embodiment given in conjunction with the accompanying drawings, in which:

FIG. 3 illustrates an option information file of an application S/W package in accordance with the preferred embodiment of the present invention;

FIG. 5 exemplifies the CML2 rule file converted from the option information file of the application S/W package in accordance with the preferred embodiment of the present invention;

DETAILED DESCRIPTION OF THE PREFERRED EMBODIMENTS

Figure 1:
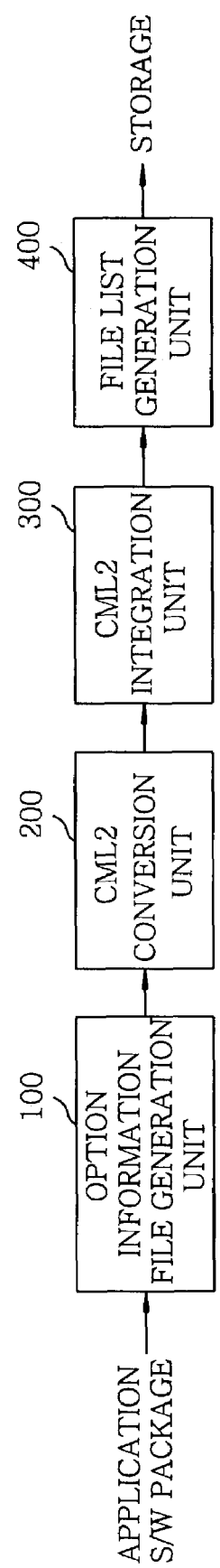
FIG. 1 is a block diagram of a software module for integrated configuration of application S/W packages and generation of an installation file list based on a CML2 computer language in accordance with a preferred embodiment of the present invention.

Referring to FIG. 1, there is illustrated a software module for integrated configuration of a Linux kernel and application software (S/W) packages and generation of an installation file list based on a CML2 computer language in accordance with a preferred embodiment of the present invention. The software module includes an option information file generation unit 100, a CML2 conversion unit 200, a CML2 integration unit 300 and a file list generation unit 400. The option information file generation unit 100 records setup options of an application S/W package to be installed at a target computer in an option information file. The CML2 conversion unit 200 converts the option information file into a rule file of the CML2 language, i.e., a CML2 rule file. The CML2 integration unit 300 integrates the CML2 rule file of option information file with a CML2 rule file of the Linux kernel. The file list generation unit 400 generates an installation file list depending on a user's selection of files recorded in the option information file. In short, the software module performs a series of processes of recording the setup options of the application S/W package in the option information file, automatically converting the option information file into the CML2 rule file to be integrated later with the CML2 rule file of the Linux kernel, setting the Linux kernel and the application S/W package in the integrated environment, and thereby generating the installation file list of the application S/W package.

Figure 2:
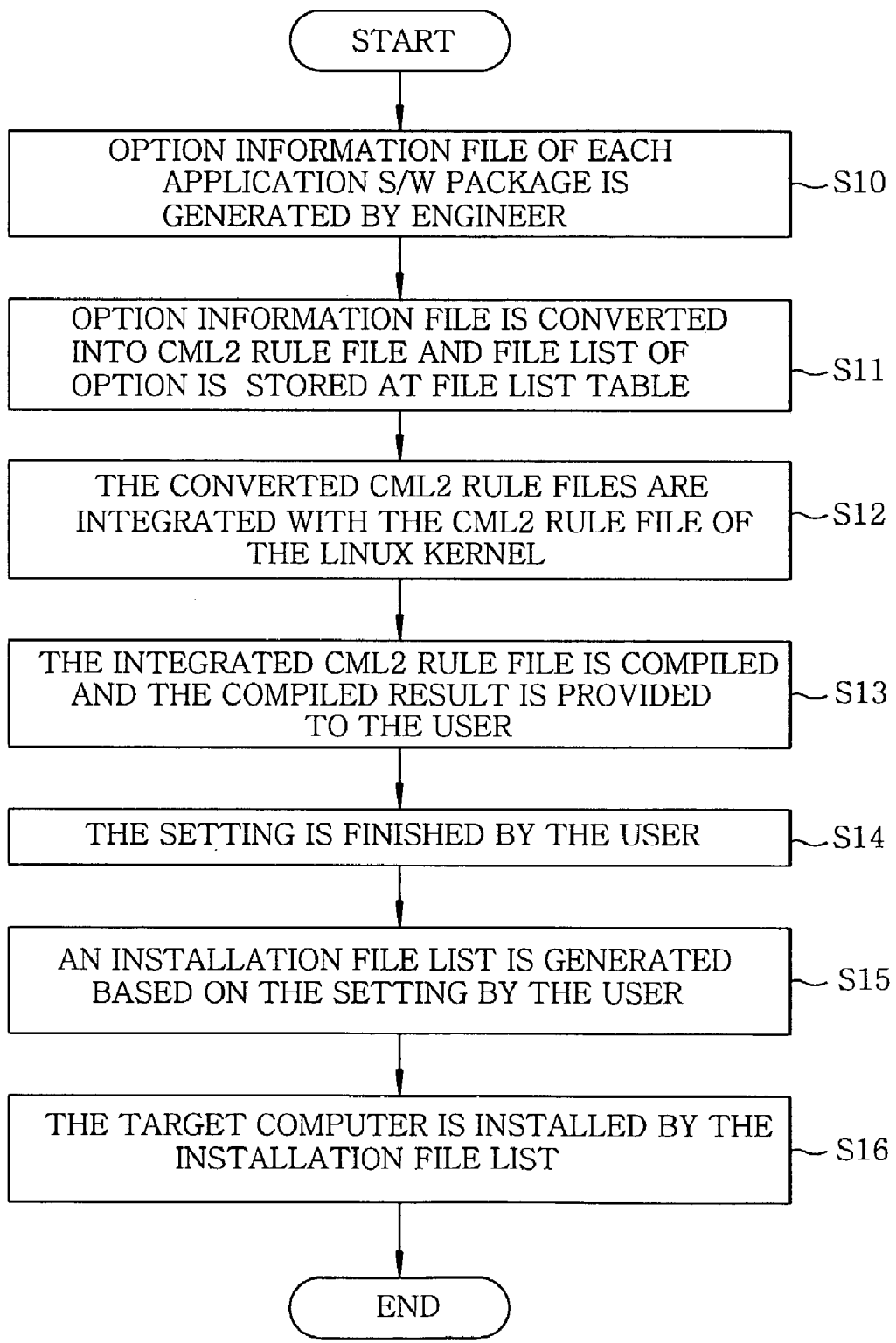
FIG. 2 provides a flowchart describing a method for integrating the application S/W packages and generating the installation file list by using a CML2 computer language in accordance with the preferred embodiment of the present invention.

In FIG. 2, there is provided a flowchart describing a method for integrating the Linux kernel and the application S/W package and generating the installation file list based on the CML2 computer language in accordance with the present invention.

First, the option information file of the application S/W package is generated (Step 10). The option information file describes setup options of the application S/W package and is created by a software developer or a distributor. As can be seen from FIG. 3, the option information file is composed of a plurality of options 25 to 28. Each option should have a name 20 identifying itself from others, a short and a long help 21 and 22 related to itself, a file list 23 describing a list of files to be installed at the target computer if the option is selected, and can optionally have a dependency rule 24 defining relationships with the other options included in the option information file or options of the Linux kernel and a group attribute information 29 indicating whether the option has subordinate options. The option name and the short and the long help are essentials of each option while the file list, the dependency rule and the group attribute information are not. A hierarchical relationship can be set between options involved, which means that an option can have a plurality of subordinate options. The hierarchy between options can be expressed in various ways. The present invention does not specify and limit the way of expressing the hierarchy between the options. For example, an option and its subordinate options can be distinguished by indenting the subordinate options, as shown in FIG. 3. In FIG. 3, a highest option 25 has two subordinate options 26 and 28 in a direct line and the subordinate option 26 also has its own subordinate option 27. An option having a group attribute only has an option name, a short help and a long help, and the group attribute information. The option with the group attribute must have a subordinate option. If there is involved a plurality of application S/W packages, each of the application S/W packages has its own option information file.

If the option information file is prepared in the step 10, the option information file is converted into a CML2 rule file (Step 11). The CML2 rule file has a fixed format as illustrated in FIG. 5. The CML2 rule file of each application S/W package includes a symbols section 58, a menus section 67, menu items 72 and 74 and dependency rules 75. The symbols section is composed of at least one symbol. In an example shown in FIG. 5, the symbols section 58 has symbols 56 and 57. A single symbol represents a single settable item in setting the CML2 language and is composed of a symbol name, a short help and a long help. The menus section 67 arranges menus 65 and 66. The menu items 72 and 74 describe hierarchical relationships between symbols, between menus and symbols and between menus. A single menu item has its subordinate symbols and menus. The menu item 72 shown in FIG. 5 has two subordinate symbols or menus 70 and 71. Relative positions of sections in the CML2 rule file can be changed. An option information file of each application S/W package should be converted into a CML2 rule file as described above.

Figure 4:
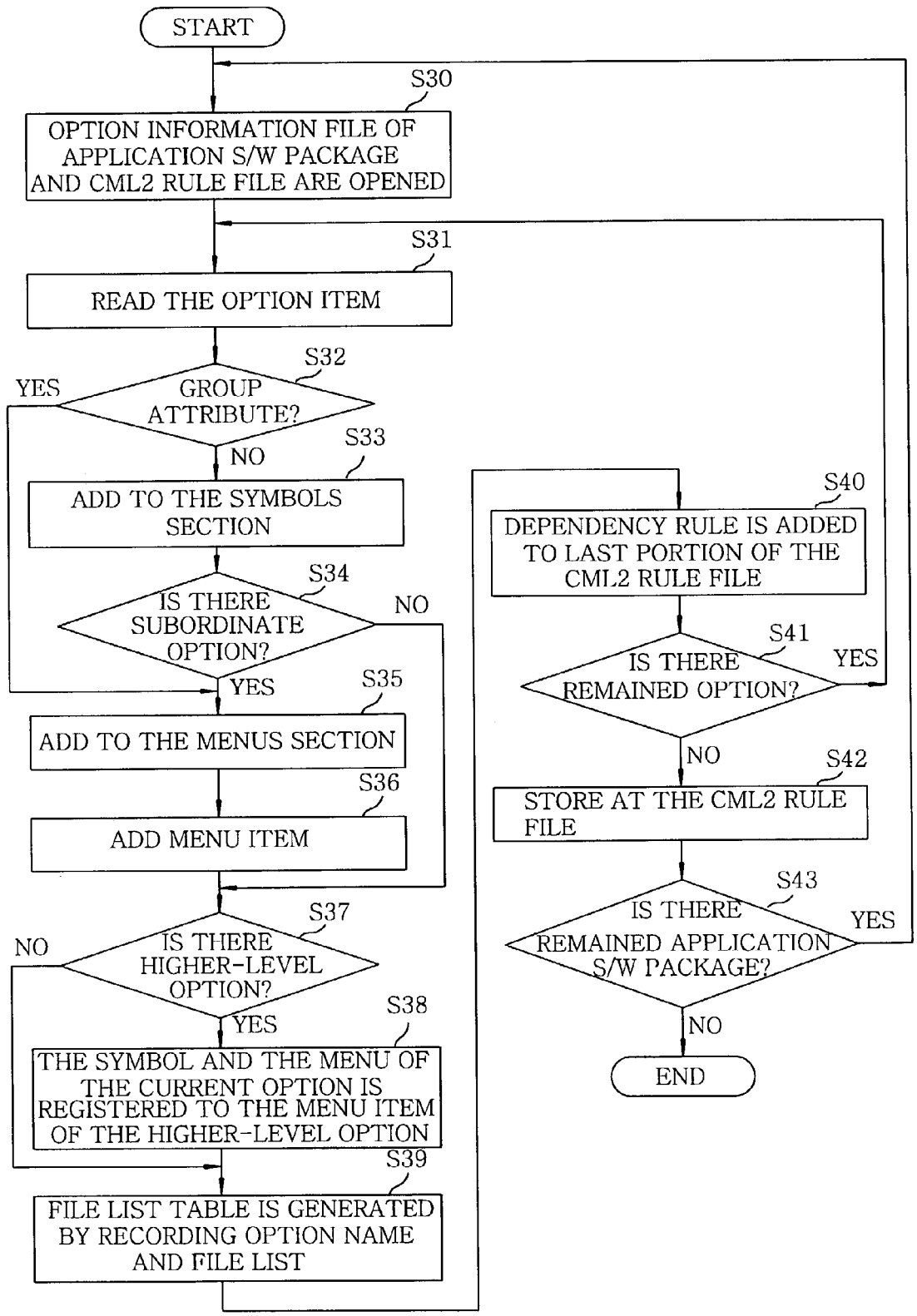
FIG. 4 depicts a flowchart describing a process for converting the option information file of the application S/W package into a CML2 rule file in accordance with the preferred embodiment of the present invention.

Referring to FIG. 4, there is described a process for converting an option information file of an application S/W package into a CML2 rule file. First, the application S/W package is selected and, then, the option information file corresponding to the selected application S/W package and the CML2 rule file for storing a conversion result are opened (Step 30). Then, options arranged in the option information file are read one by one and respectively converted into a symbol or a menu in the form of the CML2 language (Steps 31 to 42). To be more specific, an option is retrieved from the option information file (Step 31). Then, it is examined whether the option has a group attribute (Step 32). If the option has the group attribute, the option is not converted into the symbol but into the menu (Step 35). However, if the option does not have the group attribute while having a subordinate option (Step 34), the option should be converted into both the symbol and the menu, i.e., the converted option should be added to both the symbols section 58 and the menus section 67 (Steps 33 and 35).

Figure 6:
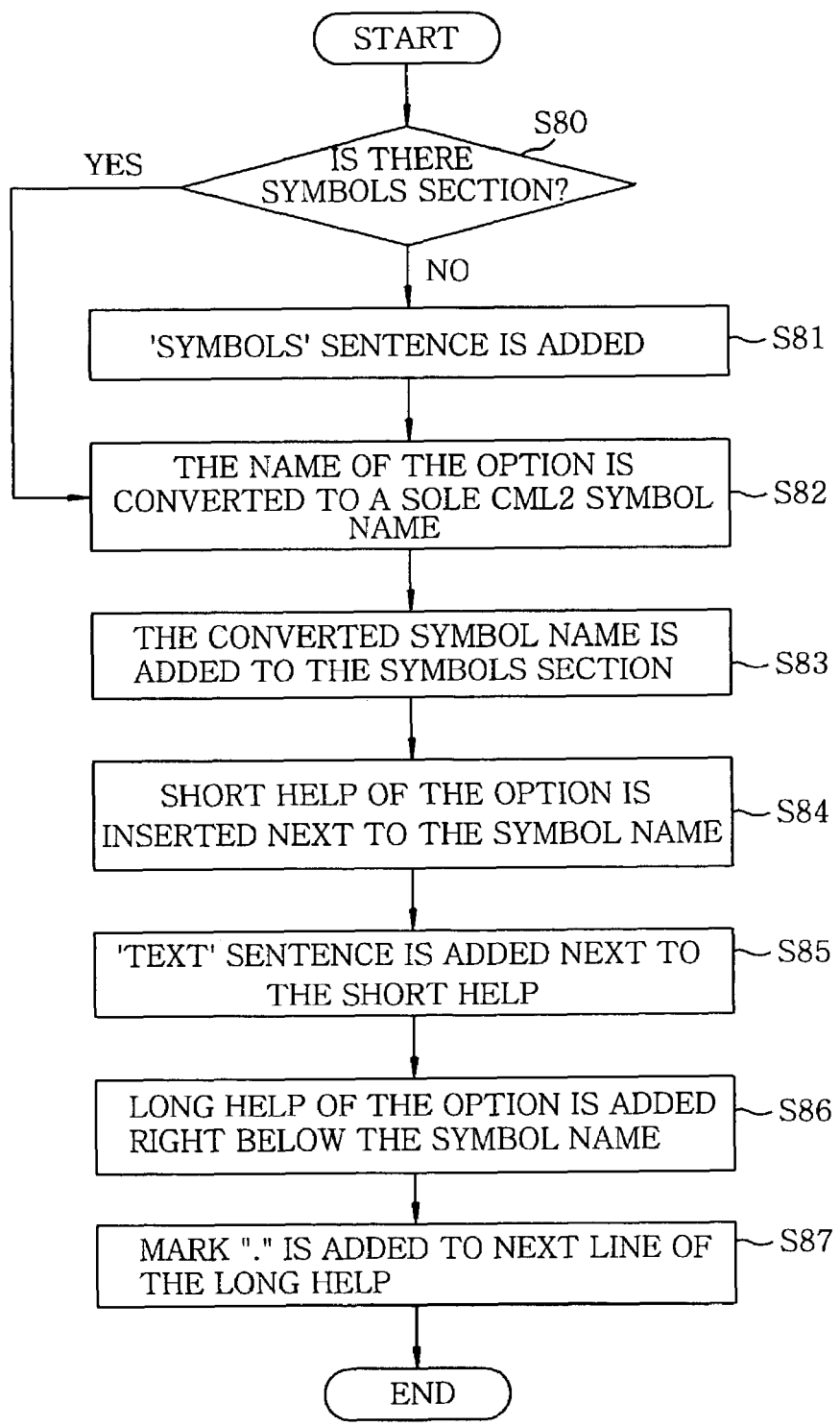
FIG. 6 offers a flowchart illustrating a process for adding an option in the option information file into a symbols section of the CML2 rule file during the conversion of the option information file in accordance with the preferred embodiment of the present invention.

Referring to FIG. 6, there is illustrated a process for converting an option item into a symbol in accordance with the present invention. If there exists no symbols section in the CML2 rule file (Step 80), a 'symbols' sentence is added to the CML2 rule file (Step 81). The 'symbols' sentence represents a symbols section, as is illustrated by a reference number 50 in FIG. 5. Thereafter, an option in the option information file is converted into a symbol and then added to the symbols section of the CML2 rule file (Steps 81 to 87). Specifically, the name 20 of the option retrieved in the step 31 is converted to a sole CML2 symbol name 51 (Step 82). In the conversion of the option name 20 into the symbol name 51, no particular constraint exists excepting that the symbol name 51 should be unique in the CML2 rule file. The converted symbol name 51 is added to the symbols section 58 (Step 83). The short help 21 of the option item is inserted to the position of a reference number 52 next to the symbol name 51 (Step 84) and, then, a 'text' sentence 53 is added next to the short help 52 (Step 85). The long help 22 of the option item is added right below the symbol name 51 as illustrated by a reference number 54 (Step 86) and a mark "." is added right below the long help 54 (step 87), thereby finishing the conversion process of the option item into the symbol item.

Referring back to FIG. 4, if the insertion of the converted option item into the symbols section is completed in the step 33, then, it is determined whether the option item has a subordinate option (Step 34). If the option item has a subordinate option, the subordinate option should be converted to a menu, which is added to the menus section 67 and the menu items 72 and 74 (Steps 35 and 36).

Figure 7:
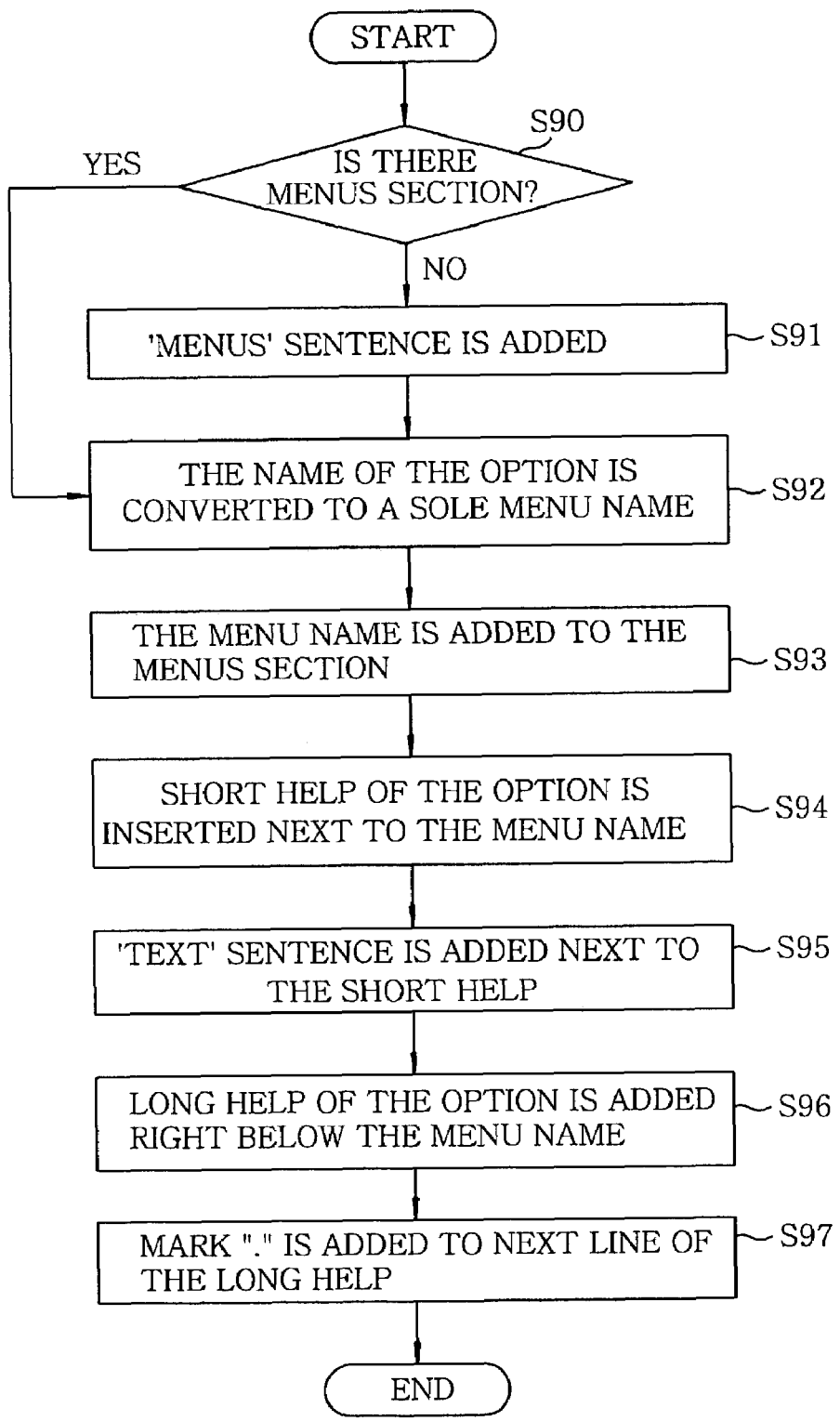
FIG. 7 is a flowchart describing a process for adding an option in the option information file into a menus section of the CML2 rule file during the conversion of the option information file in accordance with the preferred embodiment of the present invention.

FIG. 7 describes a process for adding the option item to the menus section 67. If it is found that the CML2 rule file has no menus section 67 (step 90), a 'menus' sentence is added to the CML2 rule file. The 'menus' sentence represents the menus section and is illustrated by a reference number 59 in FIG. 5. Thereafter, an option in the option information file is converted into a menu and then the menu is added to the menus section of the CML2 rule file (Steps 91 to 97). Specifically, the name 20 of the option item retrieved in the step 31 is converted to a sole CML2 menu name 60 in the CML2 rule file (Step 92). In the conversion of the option name 20 into the menu name 60, there exists no particular constraint excepting that the menu name 60 should be unique in the CML2 rule file. The menu name 60 is inserted to the menus section 67 (Step 93). The short help 21 of the option item is inserted next to the menu name 60, as is illustrated by a reference number 61 (Step 94) and, then, a 'text' sentence 62 is inserted next to the short help 61 (Step 95). The long help 22 of the option item is inserted to a next line of the menu name 60 as illustrated by a reference number 63 (Step 96) and a mark "." is added to a next line of the long help 63 (step 97), thereby finishing the conversion process of the option item into the menu in the menus section 67. Referring back to FIG. 4, after the menu is added to the menus section 67 (Step 35), the menu items 72 and 74 are added (Step 36). At this time, the addition process just involves adding a 'menu' sentence and writing the menu name converted in the step 92 next to the 'menu' sentence.

Figure 8:
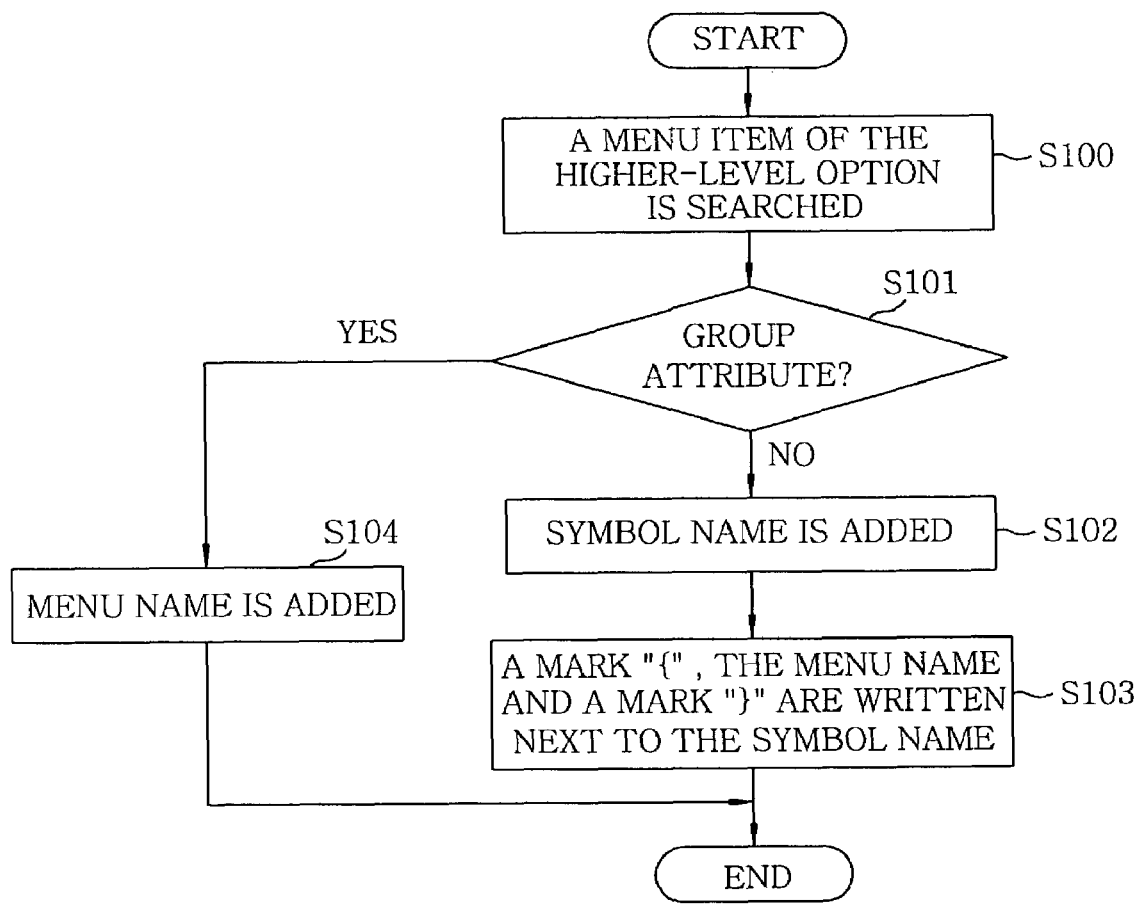
FIG. 8 shows a flowchart illustrating a process for adding menus into the CML2 rule file during the conversion of the option information file in accordance with the preferred embodiment of the present invention.

If it is found in Step 37 that there exists a higher-level option of the current option retrieved in the step 31, the symbol and the menu of the current option should be registered to the menu item of the higher-level option (Step 38). The following is a more detailed description of the step 38 provided in connection with FIG. 8.

First, a menu item of the higher-level option is searched (Step 100). If the higher-level option is found to have a group attribute (Step 101), the menu name 60 converted through the above-described steps 92 and 93 is added to the menu item of the higher-level option (Step 104). If the higher-level option does not have the group attribute, on the other hand, the symbol name 51 converted through the steps 82 and 83, as described before with reference to FIG. 6, is written in the menu item of the higher-level option (Step 102). Then, a mark "{", the menu name 60 converted through the steps 92 and 93 and a mark "}" are written next to the symbol name in the menu item of the higher-level option in said order (Step 103). During the conversion of the option into the symbol and the menu, a file list table is generated (Step 39). If the conversion of the single option into the symbol and the menu is completed, the dependency rule of the option is added to the position of a reference number 75 in the CML2 rule file (Step 40).

Figure 11:
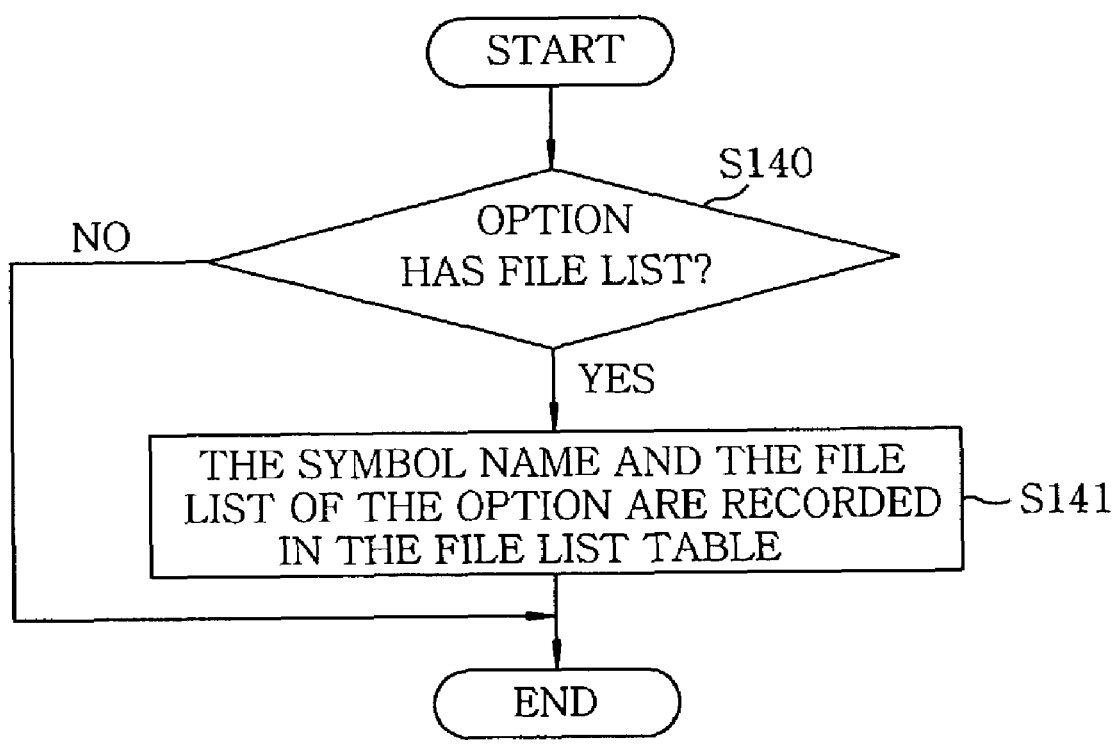
FIG. 11 sets forth a flowchart describing a process for writing a symbol name and a file list of an option in a file list table in accordance with the preferred embodiment of the present invention.

FIG. 11 illustrates a process for generating the file list table in accordance with the present invention. If the option has a file list (Step 140), the symbol name in the form of the CML2 language and the file list of the option are recorded in the file list table (Step 141).

If the conversion of a single option is terminated, a new option is read from the option information file of the application S/W package and the steps 31 to 40 are repeated for the conversion of the new option. If conversions of all the options in the option information file are completed, the option information file and the CML2 rule file of the application S/W package are closed.

The above-described steps 30 to 42 for the conversion of the option information file into the CML2 rule file are repeatedly performed until there remains no application S/W package which has not been subjected to the conversion process (Step 43). If the conversions of option information files of all the application S/W packages into the CML2 rule files are finished, their CML2 rule files are integrated with the CML2 rule file of the Linux kernel (Step 12).

Figure 9:
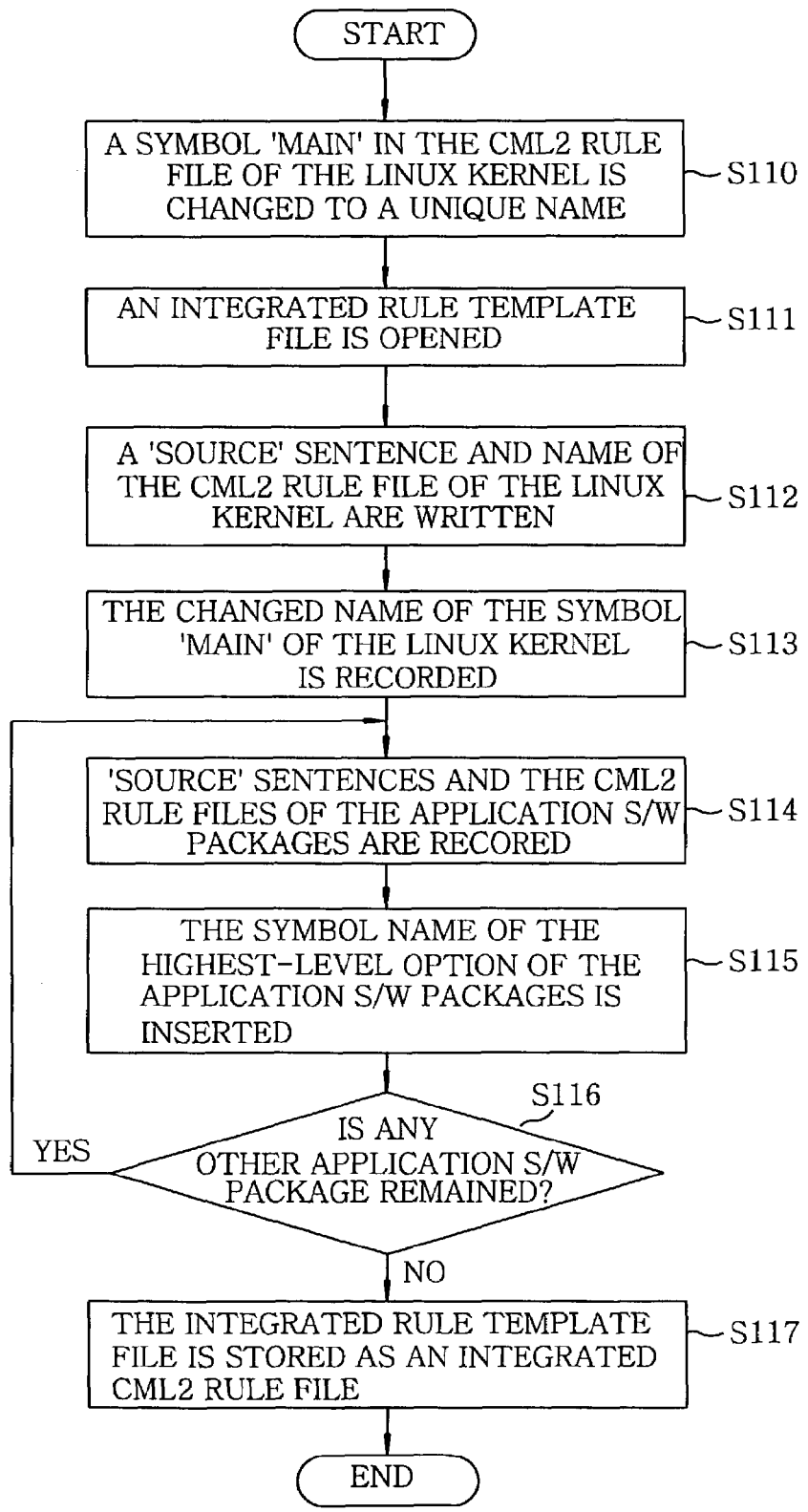
FIG. 9 provides a flowchart describing a process for integrating the CML2 rule file of the application S/W package with a CML2 rule file of a Linux kernel in accordance with the preferred embodiment of the present invention.
Figure 10A:
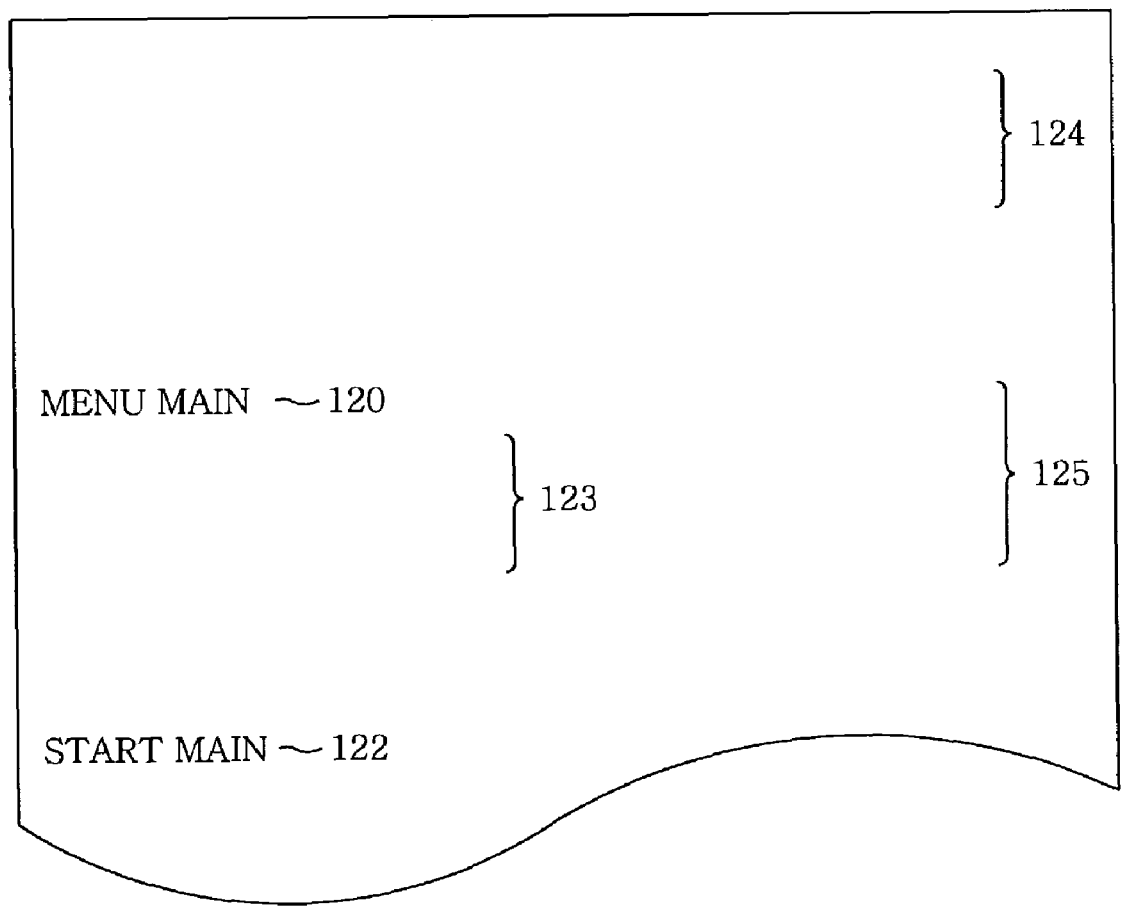
FIG. 10A shows an integrated rule template file and FIG. 10B exemplifies the integrated rule file in accordance with the preferred embodiment of the present invention.

Referring to FIG. 9, there is described a method for integrating the CML2 rule files of the application S/W packages with the CML2 rule file of the Linux kernel in accordance with the present invention. The integration is conducted by filling a template file shown in FIG. 10A by following the process to be described hereinafter with reference to FIG. 9.

Figure 10B:
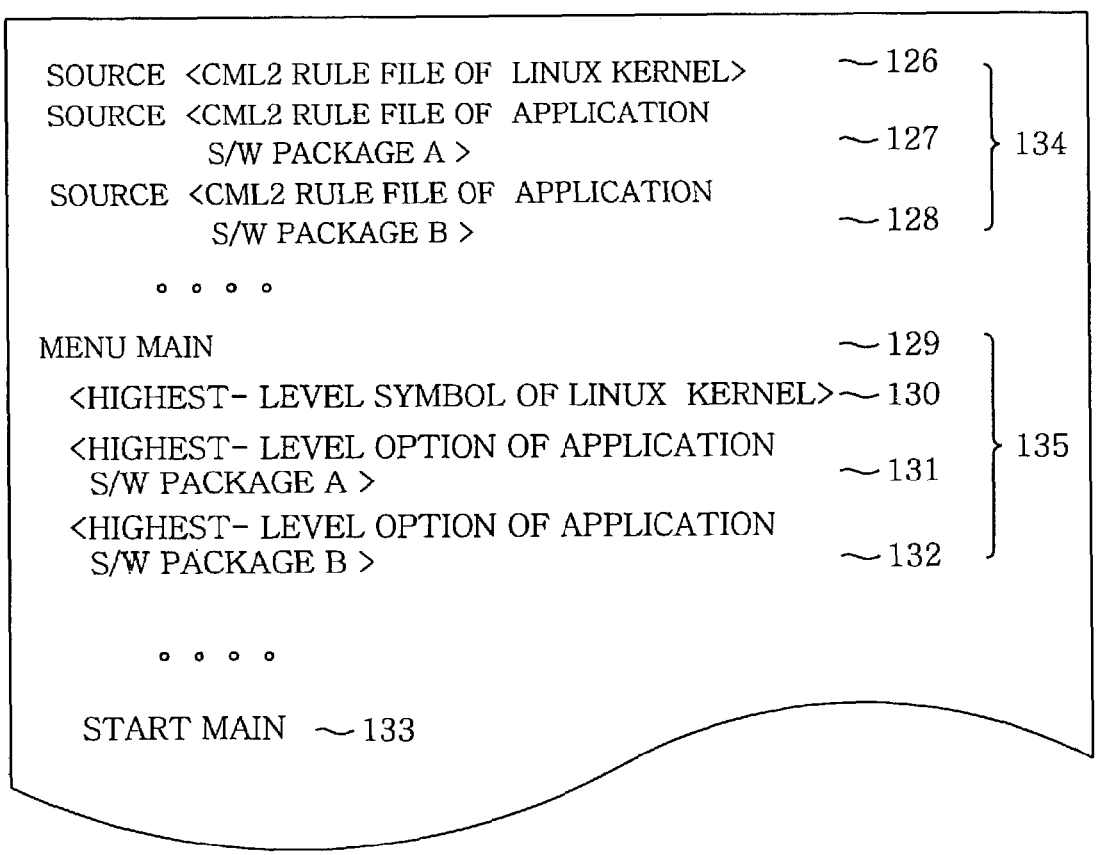

First, a symbol 'main' in the CML2 rule file of the Linux kernel is changed to a unique name (Step 110). This step is necessary because there is a rule that symbols should not have a same name in the CML2 rule file. Then, an integrated rule template file is opened (Step 111) and a 'source' sentence and the name of the CML2 rule file of the Linux kernel are sequentially written at a portion marked by a reference number 124 in FIG. 10A (Step 112). Thereafter, the changed name of the symbol 'main' of the Linux kernel is recorded in a portion marked by a reference number 123 in FIG. 10A (Step 113). Afterwards, 'source' sentences and the CML2 rule files of the application S/W packages are recorded right below the 'source' sentence and the name of the CML2 rule file of the Linux kernel in the portion 124 (Step 114). Then, the symbol name 51, which has been changed while option information files of a highest-level option of a current application S/W package are converted to CML2 rule files, is inserted to the portion 123 right below the changed name of the symbol 'main' (Step 115). The steps 114 and 115 as described above are repeatedly performed until the CML2 rule files of the application S/W packages are all processed (Step 116). After the repetition is completed, the integrated rule template file is stored as an integrated CML2 rule file (Step 117). FIG. 10B exemplifies the integrated CML2 rule file.

The integrated CML2 rule file is compiled by a CML2 compiler and the compiled result is provided to the user via a CML2 front end (Step 13). The present invention does not define how to compile the integrated CML2 rule file and show the compiled result to the user, which are dependent on the way the CML2 compiler and the front end are used. After the setting by the user is finished, a list of symbols in the form of the CML2 rule language selected by the user is finally obtained (Step 15). Then, an installation file list is generated based on the list of the symbols (Step 15).

Figure 12:
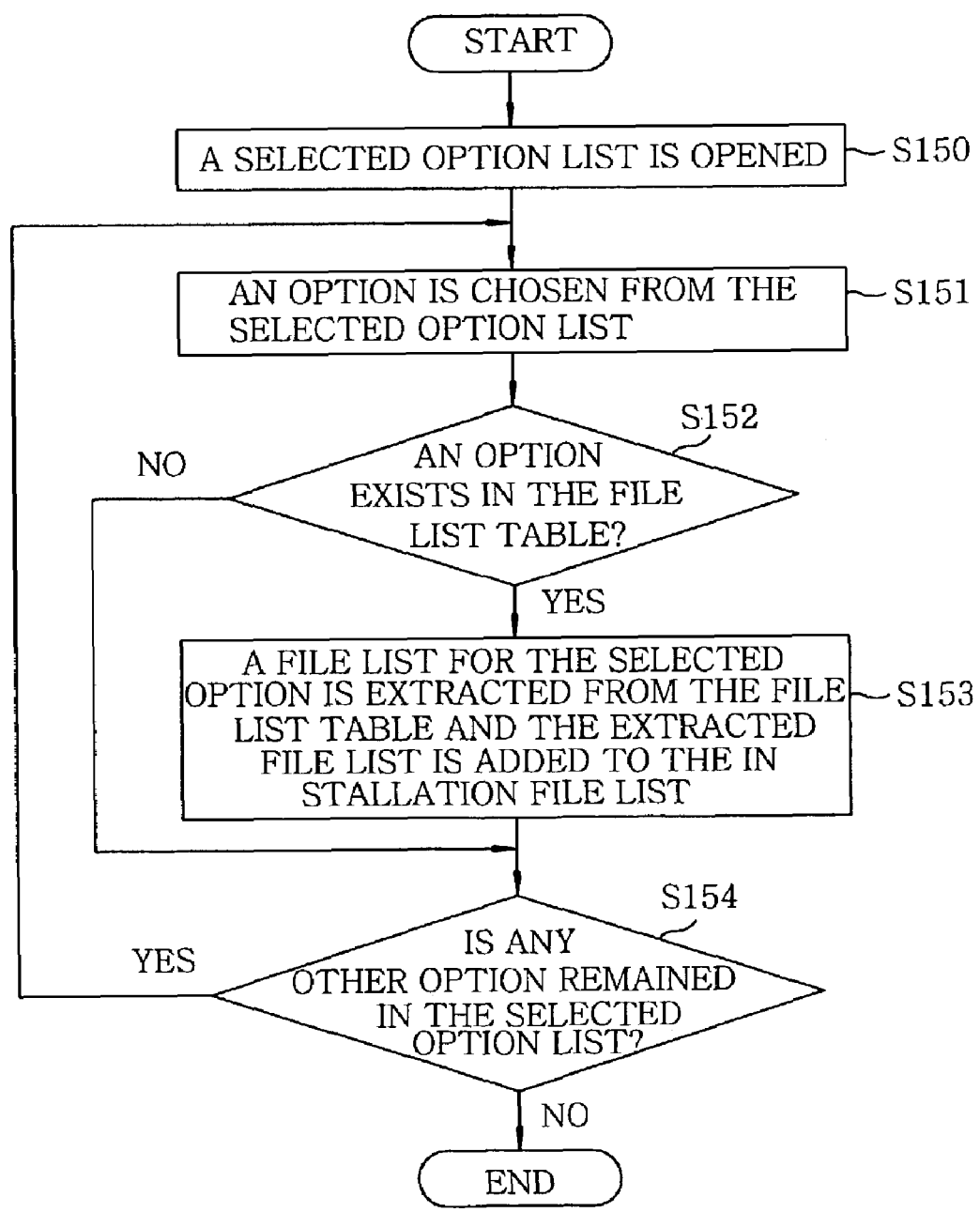
FIG. 12 depicts a flowchart illustrating a process for generating an installation file list based on a list of selected options in accordance with the preferred embodiment of the present invention.

FIG. 12 shows a process for generating the installation file list in accordance with the present invention. Referring back to the step 39 in FIG. 4, the converted CML2 symbols of the option and their corresponding file lists are recorded in the file list table. To be more specific, a selected option list is opened (Step 150) and an option is chosen from the selected option list (Step 151). Then, a file list for the selected option is extracted from the file list table by using the selected option as a key value and the extracted file list is added to the installation file list (Step 153). The steps 151 to 153 are performed for all options selected (Step 154).

The installation file list generated through the above-described process refers to a list of files to be installed at the target computer. In the case of installing the application S/W package in the target computer, only the files existing in the installation file list can be selectively installed (Step 16).

As described above, the present invention enables description of setup options of the application S/W package to be installed at the target computer through the use of the option information file. The option information file of the application S/W package is converted to the CML2 rule file, which is then integrated with the CML2 rule file of the Linux kernel, thereby realizing integrated configuration of the Linux kernel and the application S/W package and, thus, preparing an environment where the dependency rules between the Linux kernel and the application S/W package can be described. Furthermore, since every option in the option information file has a file list and these file lists are stored in the file list table to be used later to generate the file list to be installed at the target computer depending on the setting by the user, the installation file list can be easily generated.

While the invention has been shown and described with respect to the preferred embodiment, it will be understood by those skilled in the art that various changes and modifications may be made without departing from the spirit and scope of the invention as defined in the following claims.

What is claimed is:

1. A method for integrating a computer operating system kernel and application software (S/W) packages and generating an installation file list based on a configuration menu language for the operating system kernel, the method comprising:
    (a) generating an option information file for each application S/W package, recording a plurality of setup options in the option information file and identifying each setup option from others;
    (b) converting the option information file into a first configuration menu language rule file and storing the first configuration menu language rule file;
    (c) adding a dependency rule of the setup option to the first configuration menu language rule file if there exists the setup option having the dependency rule;
    (d) integrating the first configuration menu language rule file and a second configuration menu language rule file of the computer operating system kernel to obtain an integrated configuration menu language rule file and storing the integrated configuration menu language-rule file; and
    (e) generating the installation file list by compiling the integrated configuration menu language rule file.

2. The method of claim 1, wherein each setup option of the application S/W package has a 'short help', a 'long help', a 'file list', a 'dependency rule' and a 'group attribute' information in the step (a).

3. The method of claim 2, wherein each setup option always has the 'short help' and the 'long help' and optionally has the 'file list', the 'dependency rule' and the 'group attribute' information.

4. The method of claim 1, wherein the step (c) includes the steps of:
    (c1) changing a menu name 'main' of a highest-level menu in the second configuration menu language rule file of the computer operating system software kernel to a unique name;

(c2) opening a template file of the integrated configuration menu language rule file;

(c3) inserting a 'source' sentence and the name of the second configuration menu language rule file to the template file;

(c4) inserting the convened name of the highest-level menu 'main' in the computer operating system software kernel to the template file;

(c5) inserting the 'source' sentence and the name of the first configuration menu language rule file to the template file;

(c6) inserting a symbol which has been produced by converting the highest-level setup option of the application S/W package in the option information file into the first configuration menu language rule file to the template file; and (c7) storing the template file as the integrated configuration menu language rule file.

5. The method of claim 1, wherein the step (d) includes the steps of:

(d1) opening a list of selected options and selecting an option from the list;

(d2) determining whether the selected option exists in the file list table;

(d3) recording a file list for the selected option in the installation file list if the selected option exists in the file list table; and (d4) performing the steps (g1) to (g3) for all the selected options.

6. A method for integrating a computer operating system kernel and application software (S/W) packages and generating an installation file list based on a configuration menu language for the operating system kernel, the method comprising:

a) generating an option information file for each application S/W package, recording a plurality of setup options in the option information file and identifying each setup option from others;

(b) converting the option information file into a first configuration menu language rule file and storing the first configuration menu language rule file, wherein converting the option information file includes the sub-steps of:

(b1) inserting a 'name', a 'short help', and a 'long help' of each setup option into a 'symbols' section of the first configuration menu language rule file;

(b2) adding the 'name', the 'short help', and the 'long help' of each setup option to a 'menus' section of the first configuration menu language rule file;

(b3) adding a symbol and a menu to a 'menu item' of the first configuration menu language rule file;

(b4) adding a dependency rule of the setup option to the first configuration menu language rule file if there exists the setup option having the dependency rule; and (b5) storing a file list of each setup option in a file list table, wherein the step (b1) is skipped if the setup option has a group attribute while the steps (b2), (b3) are skipped if the setup option does not have the group attribute;

(c) integrating the first configuration menu language rule file and a second configuration menu language rule file of the computer operating system kernel to obtain an integrated configuration menu language rule file and storing the integrated configuration menu language rule file; and (d) generating the installation file list by compiling the integrated configuration menu language rule file.

7. The method of claim 6, wherein the step (b1) includes the steps of:

(b11) converting the name of the setup option into a sole symbol name in the first configuration menu language rule file at a time of generating the first configuration menu language rule file, adding the symbol name to the 'symbols' section and inserting the 'short help' of the option next to the symbol name;

(b12) inserting a 'text' sentence next to the 'short help'; and (b13) adding the 'long help' at a next line of the symbol name.

8. The method of claim 6, wherein the step (b2) includes the steps of:

(b21) converting the name of the setup option into a sole menu name in the first configuration menu language rule file at a time of generating the first configuration menu language rule file, adding the menu name to the 'menus' section and inserting the 'short help' next to the menu name;

(b22) inserting a 'text' sentence next to the 'short help'; and (b23) adding the 'long help' to a next line of the menu name.

9. The method of claim 6, wherein the step (b3) includes the steps of:

(b31) searching for a menu item of a higher-level option in a direct line at a time of generating the first configuration menu language rule file;

(b32) determining whether the higher-level option has a group attribute; and (b33) inserting the symbol name, a mark '{', the menu name, and a mark '}' sequentially to the menu item if the higher-level option does not have the group attribute and inserting the menu name to the 'menu item' if the higher-level option has the group attribute.

10. The method of claim 7, wherein the step (b3) includes the steps of:

(b31) searching for a menu item of a higher-level option in a direct line at a time of generating the first configuration menu language rule file;

(b32) determining whether the higher-level option has a group attribute; and (b33) inserting the symbol name, a mark '{', the menu name, and a mark '}' sequentially to the menu item if the higher-level option does not have the group attribute and inserting the menu name to the 'menu item' if the higher-level option has the group attribute.

11. The method of claim 8, wherein the step (b3) includes the steps of:

(b31) searching for a menu item of a higher-level option in a direct line at a time of generating the first configuration menu language rule file;

(b32) determining whether the higher-level option has a group attribute; and (b33) inserting the symbol name, a mark '{', the menu name, and a mark '}' sequentially to the menu item if the higher-level option does not have the group attribute and inserting the menu name to the 'menu item' if the higher-level option has the group attribute.

12. The method of claim 6, wherein the dependency rule of the setup option is inserted to a 'dependency' section of the first configuration menu language rule file in the step (b4).

13. The method of claim 6, wherein the step (b5) includes the steps of:

(b51) determining whether the setup option has the file list; and (b52) storing the symbol name of the setup option and the file list in the file list table if the setup option has the file list.

* * * * *